(12) United States Patent
Bucchia

(10) Patent No.: US 11,839,281 B2
(45) Date of Patent: Dec. 12, 2023

(54) TRAVEL SUITCASE

(71) Applicants:CRASH BAGGAGE S.R.L., Mira (IT); Adriano Bucchia, Sant'Angelo di Piove di Sacco (IT)

(72) Inventor: Adriano Bucchia, Sant'Angelo di Piove di Sacco (IT)

(73) Assignee: CRASH BAGGAGE S.R.L., Mira (IT)

( * ) Notice: Subject to any disclaimer, the term of this patent is extended or adjusted under 35 U.S.C. 154(b) by 330 days.

(21) Appl. No.: 17/058,100

(22) PCT Filed: Apr. 2, 2019

(86) PCT No.: PCT/IB2019/052685
§ 371 (c)(1),
(2) Date: Nov. 23, 2020

(87) PCT Pub. No.: WO2019/193492
PCT Pub. Date: Oct. 10, 2019

(65) Prior Publication Data
US 2021/0196016 A1    Jul. 1, 2021

(30) Foreign Application Priority Data
Apr. 3, 2018   (IT) ........................ 102018000004182

(51) Int. Cl.
*A45C 5/14*    (2006.01)
*A45C 13/26*   (2006.01)
(Continued)

(52) U.S. Cl.
CPC .............. *A45C 5/14* (2013.01); *A45C 13/262* (2013.01); *A45C 5/03* (2013.01);
(Continued)

(58) Field of Classification Search
CPC ........... A45C 5/14; A45C 13/262; A45C 5/03; A45C 2005/148; A45C 2013/267; B60B 33/0039; B60B 2200/45
See application file for complete search history.

(56) References Cited

U.S. PATENT DOCUMENTS 988,533 A  *  4/1911  Zverina ................... A63C 17/06
                                                152/9
3,389,922 A  *  6/1968  Eastin .................... A63C 5/035
                                                280/11.233
(Continued)

FOREIGN PATENT DOCUMENTS

WO       02/096763 A2    12/2002
WO       2016142919 A1    9/2016

*Primary Examiner* — Tri M Mai
(74) *Attorney, Agent, or Firm* — David B. Tingey; Bryant J. Keller; Kirton McConkie

(57) ABSTRACT

The travel suitcase comprises: at least one container body for containing objects and/or clothes; at least one gripping element that can be grasped by a user for the movement of said suitcase; at least one wheel for pulling the suitcase on the ground, comprising: an external rolling body made of polymeric material and comprising two lateral sides and a joining portion; two annular flanges defining a support seat; wherein the lateral sides comprise two respective ending portions inserted in the support seat and placed in mutual contact to define an air chamber with the joining portion.

9 Claims, 2 Drawing Sheets

(51) Int. Cl.
*A45C 5/03* (2006.01)
*B60B 33/00* (2006.01)

(52) U.S. Cl.
CPC .. *A45C 2005/148* (2013.01); *A45C 2013/267* (2013.01); *B60B 33/0039* (2013.01); *B60B 2200/45* (2013.01)

(56) References Cited

U.S. PATENT DOCUMENTS

| | | | | |
|---|---|---|---|---|
| 4,004,628 A | * | 1/1977 | Tangorra | B60C 15/028 |
| | | | | 152/526 |
| 5,733,015 A | * | 3/1998 | Demarest | B29C 65/565 |
| | | | | 301/5.307 |
| 2004/0238303 A1 | * | 12/2004 | Hafif | A45C 5/143 |
| | | | | 190/115 |
| 2005/0077706 A1 | * | 4/2005 | O'Shea | A45C 5/146 |
| | | | | 280/655 |

* cited by examiner

TRAVEL SUITCASE

TECHNICAL FIELD

The present invention relates to a travel suitcase.

BACKGROUND ART

Travel suitcases of different types, sizes and materials are known varying according to the needs of travelers and to the type of trip.

The travel suitcases used to date have a body container for the containment of clothes and/or objects, at least one gripping element of the type of a handle, and two or more wheels for pulling the suitcase on the ground.

In particular, these wheels are associated with the suitcase by means of a central pin inserted by interlocking and adapted to allow the rotation of the same during pulling on the ground.

The wheels of known type have a rim element, made of metal or plastic, housing a rotary bearing inside and supporting an external rolling body.

The need to reduce the noise emission due to the rolling of the wheels on the sliding surfaces is well known.

In this regard, a known type of travel suitcase comprises at least one wheel having an external rolling body made of polymeric material, supporting means comprising, in turn, two annular flanges, at least one rotary bearing placed between the supporting means and the container body.

The external rolling body comprises two lateral sides adapted to delimit an air chamber between the external rolling body and the supporting means and on which lateral sides the annular flanges can be tightened in a sandwich-like fashion.

The supporting means also comprise a rim element intended to support the external rolling body and provided with an internal space in which the annular flanges can be inserted on opposite sides.

The external rolling body defines with the flanges some spaces in which the sides of the rolling body can be inserted.

The sides of the rolling element and the supporting body define the air chamber. A drawback of this known type of suitcase is related to the presence of the supporting means, consisting of multiple pieces, complex to assemble and noisy.

The rim element, in particular, increases the complexity of the assembly of the wheel parts, with a consequent increase in the times and costs required to manufacture the wheel and the suitcase.

In addition, the sides of the rolling body, in order to be inserted in the spaces defined by the flanges and by the supporting body, need a special shaping, with a consequent thinning of the portion of sides which is adapted to be inserted in such spaces.

This increases the risk that the rolling element may disengage (bead-breaking phenomenon), totally or partially, thus undermining the functionality of the wheel or increasing the noise levels.

DESCRIPTION OF THE INVENTION

The main aim of the present invention is to devise a travel suitcase that allows reducing the noise pollution caused by pulling the same on the ground.

One object of the present invention is to devise a travel suitcase the wheels of which are silent, easy to assemble and durable.

One object of the present invention is to devise a travel suitcase the wheels of which are not susceptible to the bead-breaking phenomenon.

Another object of the present invention is to devise a travel suitcase that allows overcoming the mentioned drawbacks of the prior art in a simple, rational, easy, effective to use and cost-effective solution.

The above objects are achieved by the present travel suitcase having the characteristics of claim 1.

BRIEF DESCRIPTION OF THE DRAWINGS

Other characteristics and advantages of the present invention will be more evident from the description of a preferred, but not exclusive, embodiment of a travel suitcase, illustrated as an indication, but not limited to, in the attached tables of drawings in which.

EMBODIMENTS OF THE INVENTION

Figure 1:
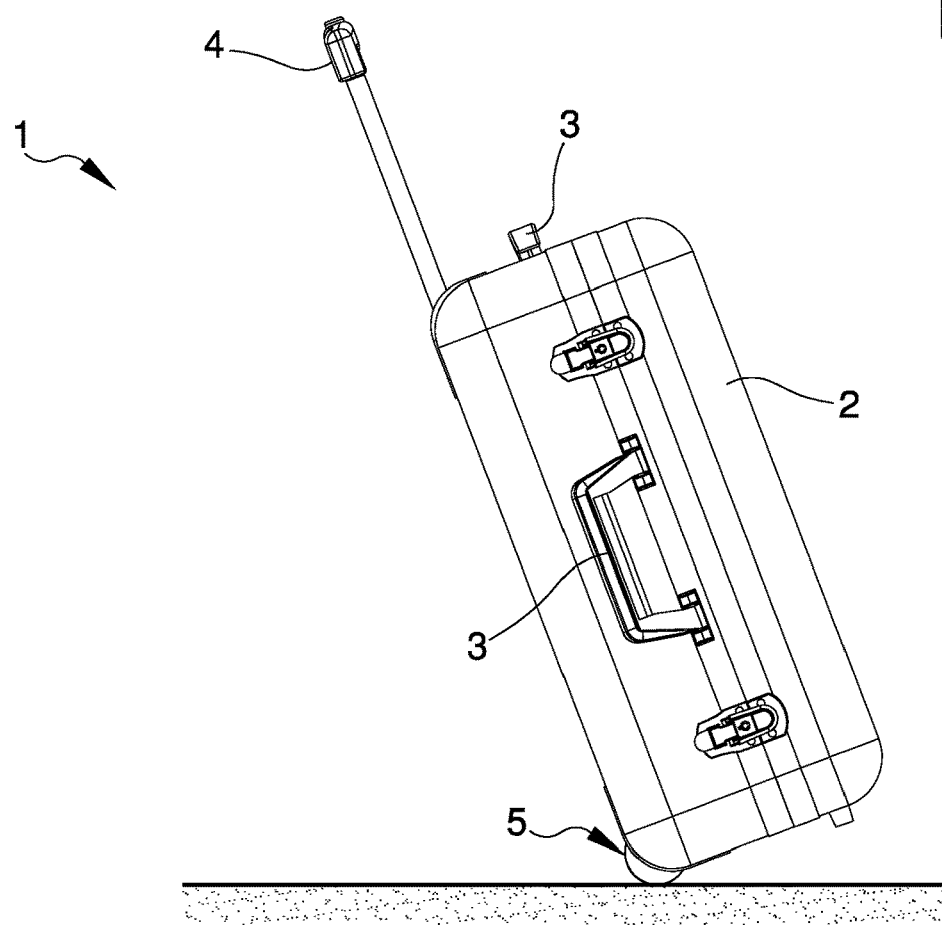
FIG. 1 is a cross-sectional view of the suitcase according to the invention.
Figure 2:
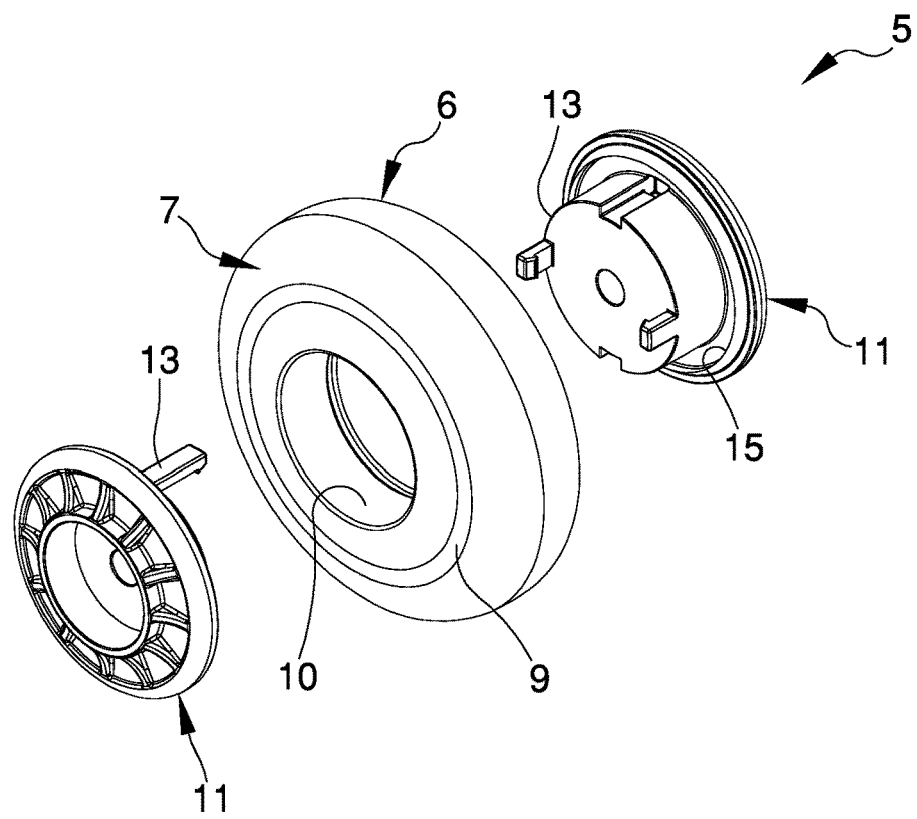
FIG. 2 is an axonometric exploded view of a detail of the suitcase according to the invention.
Figure 4:
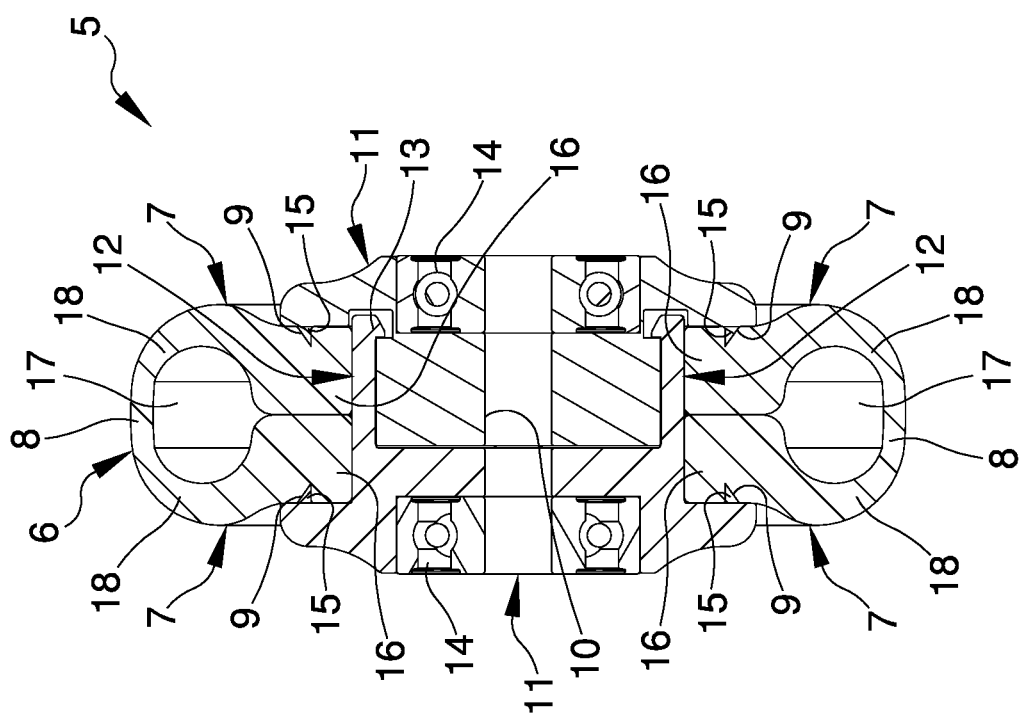
FIG. 4 is a cross-sectional view of a detail of the suitcase according to the invention.
Figure 3:
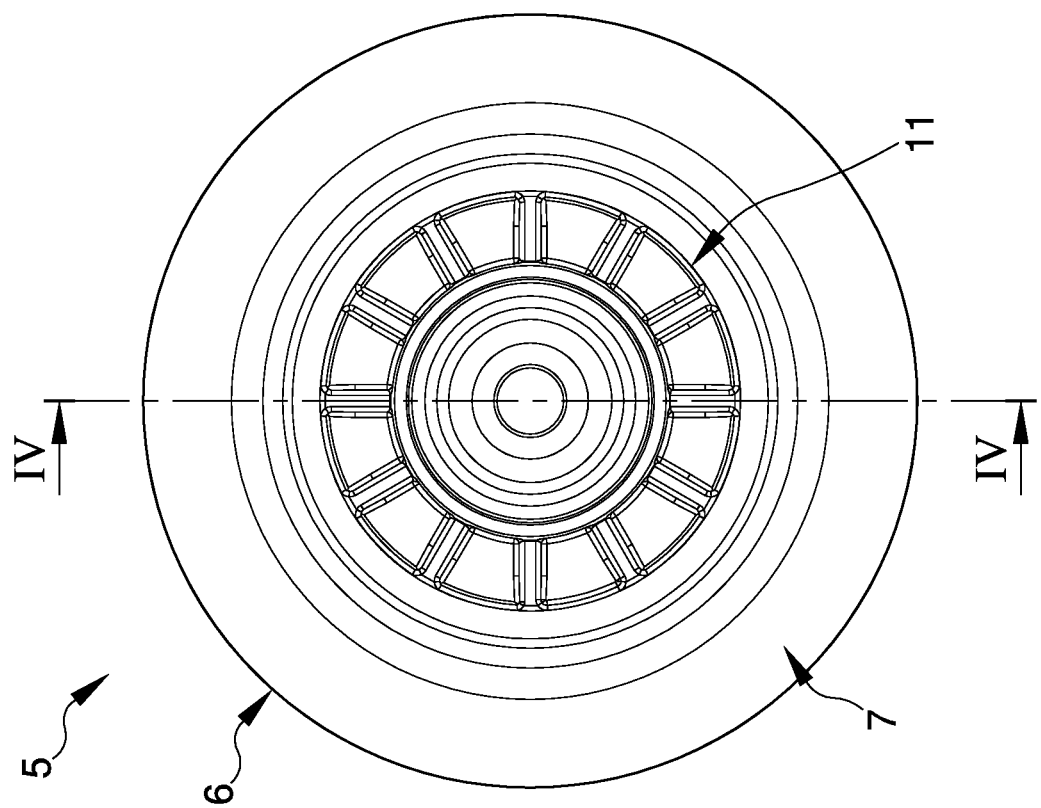
FIG. 3 is a side view of a detail of the suitcase according to the invention.

With particular reference to these illustrations, reference numeral 1 globally indicates a travel suitcase.

It should be noticed that, in the context of the present discussion, the word "suitcase" means any type of container equipped with handle and wheels and used for transporting objects and clothes during a trip.

The suitcase 1, therefore, can be of the type of a trolley, a bag, a hard suitcase or the like.

The suitcase 1 comprises a container body 2 for containing objects and/or clothes.

The container body 2 has a parallelepiped shape and can be made of plastic, leather, fabric, metal or other material.

The suitcase 1 also comprises at least one gripping element 3, 4, e.g. a handle 3 or a pulling grip 4, which can be extended and grasped by a user for the movement of the suitcase itself.

With reference to the particular embodiment shown in the illustrations, the suitcase 1 has two handles 3 for lifting the same, arranged on two adjacent lateral faces of the container body 2 and a pulling grip 4, arranged on an adjacent face, for pulling the suitcase itself on the ground.

The suitcase 1, in fact, comprises at least one wheel 5 adapted to allow it to be pulled on the ground.

Advantageously, the suitcase 1 has two wheels 5, arranged parallel to each other and associated below with the container body 2, but solutions cannot be ruled out providing for a larger number of wheels, e.g. four wheels, or a different arrangement of the same.

The diameter of the wheels is usually comprised between 40 mm and 80 mm, preferably 70 mm in the event of the suitcase 1 comprising two wheels.

Dimensions of the wheels different from those mentioned above cannot be ruled out.

As can be seen in the illustrations, each wheel 5 is mounted in such a way as to protrude from the latter by at least one third of its volume; this allows the free rotation of the wheel 5 by sliding contact with the ground.

The wheel 5 comprises an external rolling body 6 made of polymeric material and comprising two lateral sides 7 and a joining portion 8.

The joining portion 8 is the portion that comes into direct contact with the ground when the suitcase 1 is pulled on the ground.

The rolling body 6 usefully comprises at least one groove 9 formed on at least one of the lateral sides 7.

In the present embodiment, the rolling body 6 comprises two grooves 9 formed on both lateral sides 7 respectively.

In particular, the rolling body 6 comprises a groove 9 on a lateral side 7 and another groove 9 on the other lateral side 7 placed symmetrically with respect to a substantially vertical axis.

The rolling body 6 defines an annular opening 10 in which a pin, or a hub, or another support can be inserted which is adapted to associate the wheel 5 to the container body 2.

In particular, the wheel 5 comprises two supporting annular flanges 11 defining a support seat 12.

The annular flanges 11 are usefully closable in a sandwich-like fashion on the lateral sides 7.

The annular flanges 11, in fact, have coupling portions 13 inserted in the opening 10 and coupled to each other for sandwich-like closure.

In the present embodiment, the annular flanges 11 house two respective rotary bearings 14.

Solutions wherein there are no bearings cannot be ruled out.

Advantageously, the annular flanges 11 comprise a protruding element 15 overhanging in the support seat 12.

In particular, each annular flange 11 comprises a respective protruding element 15.

With reference to the figures shown, each protruding element 15 is coupled to a corresponding groove 9.

This feature allows increasing the stability of the wheel 5, thus reducing the risk of the annular flanges 11 and the rolling body 6 disassembling as a result of the stresses received during rolling on the ground.

Alternative solutions cannot be ruled out wherein the protruding element 15 is only formed on an annular flange 11, or where there are several protruding elements and several grooves.

According to the invention, the lateral sides 7 comprise two respective ending portions 16 inserted in the support seat 12 and placed in mutual contact to define an air chamber 17 with the joining portion 8.

This way, no additional supporting means are required in addition to the annular flanges 11, with a consequent reduction in the times and costs of construction of the wheel 5 and, therefore, of the suitcase 1.

In addition, the air chamber 17 is delimited by a substantially continuous wall made of only polymeric material, with a consequent reduction in the noise emitted during the sliding process.

Advantageously, the ending portions 16 entirely fill the support seat 12.

As shown in the figures, each lateral side 7 comprises an intermediate portion 18 connected to the joining portion 8 and an ending portion 16.

In the present embodiment, the ending portions 16 are thicker than the intermediate portions 18.

Still in this embodiment, the ending portions are symmetrical with respect to a substantially vertical axis, but solutions cannot be ruled out wherein one ending portion is larger than the other, or wherein the portions are asymmetrical with respect to a vertical axis.

Advantageously, the groove is formed at the ending portions 16.

Since the ending portions 16 are thicker than the intermediate portions 18, the coupling between the protruding element 15 and the groove 9 is less invasive for the structure of the rolling body 6 and more stable.

Advantageously, the joining portion 8 has a bigger radius of curvature than the intermediate portion 18.

The joining portion 8 is substantially flattened with respect to the intermediate portion 18.

This feature allows reducing the friction generated in contact with the ground, thus increasing the noiselessness during transport.

The operation of the present invention is as follows.

By pulling the suitcase 1 through the pulling grip 4 or the handles 3, the wheel 5 rolls and slides on the ground.

The vibrations produced by the contact between the wheel 5 and the ground are absorbed by the ending portions 16 and by the air chamber 17.

The protruding element 15, being engaged in the groove 9, retains the rolling body 6 to the flanges 11.

This retaining action is combined with the action of the ending portions 16 that are placed in contact with each other and inserted in the support seat 12.

This way, the rolling body 6 is prevented from escaping from the annular flanges 11, avoiding the "bead-breaking" phenomenon.

It has in practice been ascertained that the described invention achieves the intended objects and, in particular, the fact is underlined that the devised suitcase makes it possible to reduce the noise pollution caused by pulling it on the ground.

The mounted wheels, in fact, thanks to the particular ending portions and their positioning in the insertion seat prevent excessive propagation of vibrations coming from contact with the ground, thus resulting noiseless.

These wheels, besides being noiseless, are easy to assemble and durable.

The special ending portions and the insertion seat, in fact, make it possible to do without additional supporting means, such as supporting rings or the like, making the wheel easier to assemble and, therefore, cheaper.

In addition, the coupling between the groove and the protruding element allows ensuring stability of the assembly.

This is why the devised suitcase has wheels that are not susceptible to bead-breaking phenomenon.

The action of retaining the protruding element, together with the conformation and arrangement of the ending portions, facilitates the stability of the assembly between the rolling body and the annular flanges, thus minimizing the risk of bead-breaking.

The invention claimed is:

1. A travel suitcase, comprising:
   at least one container body for containing at least one of (i) objects and (ii) clothes;
   at least one gripping element that can be grasped by a user for movement of said suitcase;
   at least one wheel for pulling said suitcase on a ground surface, the at least one wheel for pulling said suitcase comprising:
   an external rolling body comprising a polymeric material, two lateral sides and a joining portion; and
   two annular flanges defining a support seat;

wherein said two lateral sides comprise two respective ending portions inserted in said support seat and placed in mutual contact to define an air chamber with said joining portion, wherein said external rolling body defines an annular opening in which at least one of (a) a pin, (b) a hub, and (c) a structural support can be inserted to associate said at least one wheel to said at least one container body, wherein said two annular flanges are closable in a sandwich-like fashion on said two lateral sides and have coupling portions inserted in said annular opening and coupled to each other for sandwich-like closure, and wherein said coupling portions comprise coupling teeth.

2. The suitcase according to claim 1, wherein said external rolling body comprises at least one groove formed on at least one of said two lateral sides.

3. The suitcase according to claim 2, wherein said two annular flanges comprise a protruding element overhanging in said support seat and coupled to said at least one groove.

4. The suitcase according to claim 2, wherein said at least one groove is formed at said two respective ending portions.

5. The suitcase according to claim 2, wherein said external rolling body comprises two of said at least one groove formed on each of said two lateral sides respectively, with one of said two of said at least one groove on one of said two lateral sides and another of said two of said at least one groove on the other of said two lateral sides, placed symmetrically with respect to a substantially vertical axis.

6. The suitcase according to claim 1, wherein each of said two lateral sides comprises an intermediate portion connected to said joining portion and one of said two respective ending portions.

7. The suitcase according to claim 6, wherein at least one of said two respective ending portions is thicker than said intermediate portion.

8. The suitcase according to claim 6, wherein said joining portion has a bigger radius of curvature than said intermediate portion.

9. The suitcase according to claim 1, wherein said two respective ending portions entirely fill the support seat.

* * * * *